Patented July 25, 1944

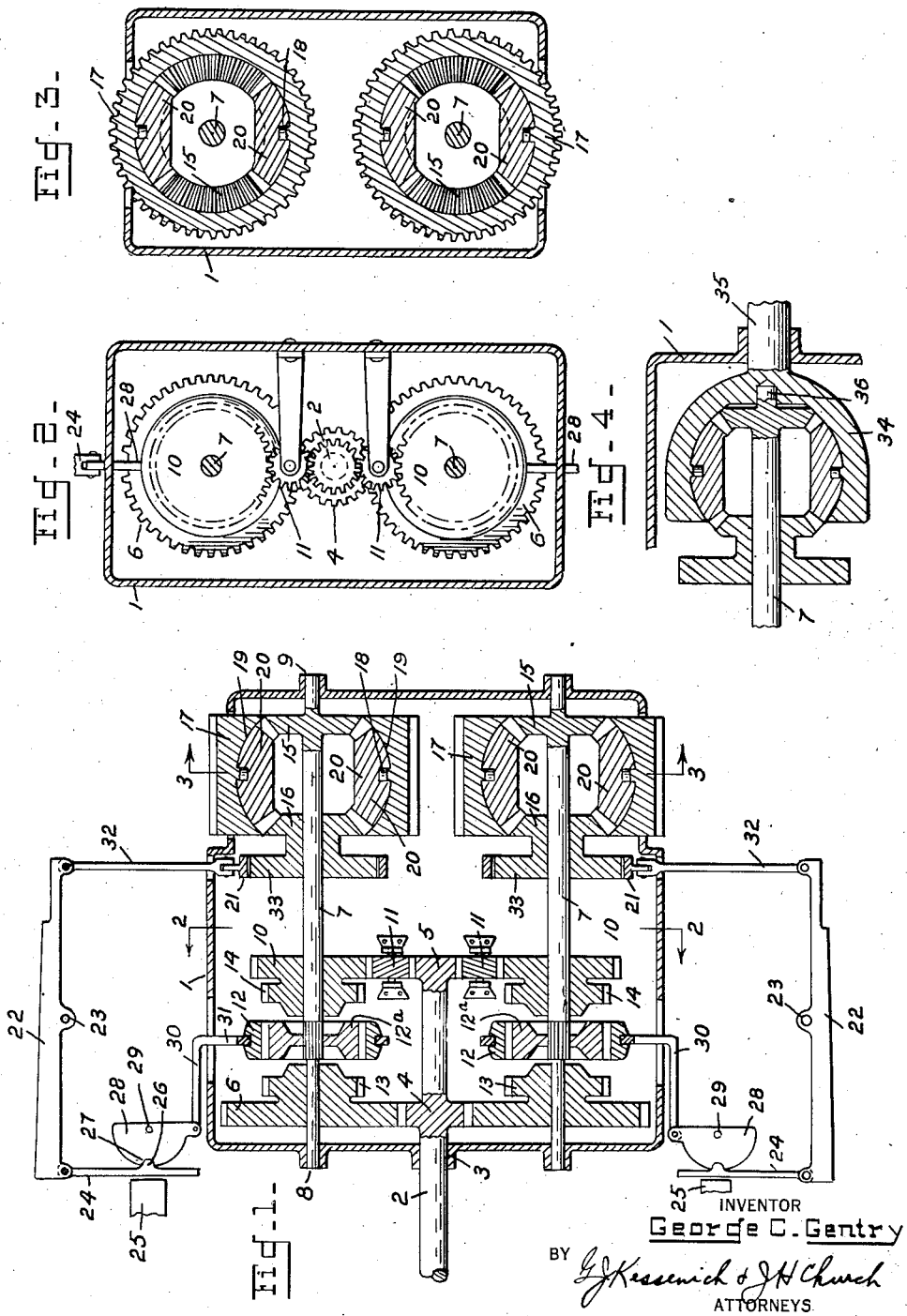

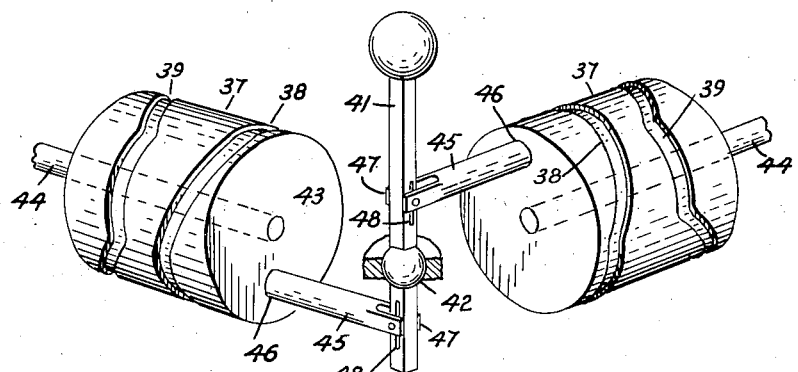
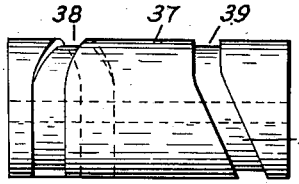
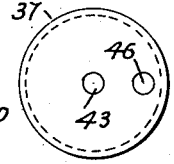
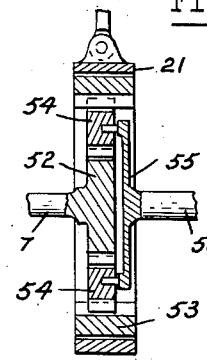
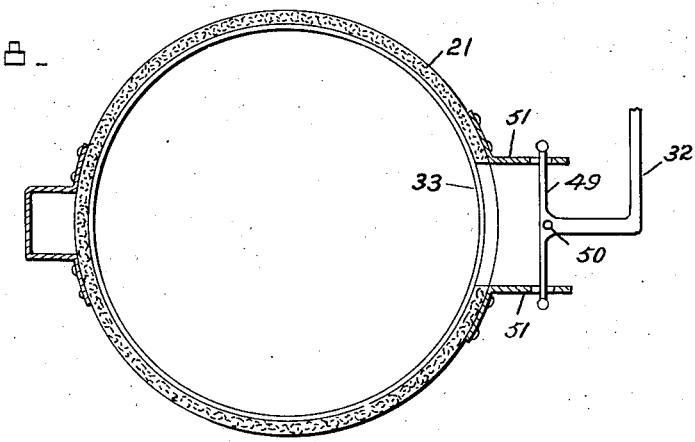

2,354,204

UNITED STATES PATENT OFFICE 2,354,204

TURRET DRIVE FOR GUNS

George C. Gentry, United States Army, Oakwood, Ohio

Application April 21, 1941, Serial No. 389,608

14 Claims. (Cl. 74—264)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a turret drive for guns and the like, and in particular to a device wherein a single power input is transmitted to both azimuth and elevation control, each being reversible.

Briefly the invention comprises a power drive geared to two sets of pinions each having a pair of gears rotated in opposite senses by the power drive and communicating rotation alternatively to a drive shaft by means of a sliding gear splined to the shaft. The shaft carries a system of differential gearing terminating in an idler which may be braked to transmit the motion of the gearing to the power output at the turret.

It is therefore an object of this invention to provide a drive mechanism having at least two points of power output operating from a single power input.

It is a further object of this invention to provide a turret drive having a continuously available power input.

It is a further object of this invention to provide a turret drive mechanism having a single device to operate reverse gearing and the clutch mechanism.

It is a further object of this invention to provide a turret drive adaptable for operation by remote control.

It is a further object of this invention to provide a turret drive having a novel system of transmission gearing.

It is a further object of this invention to provide a turret drive having a gearing with a smooth motion for all speeds and a rapid reversal of direction and rapid change of speed.

It is a further object of the invention to provide a turret drive with a cam device operating both gear reversal and clutch.

It is a further object of this invention to provide a turret drive having separate transmission branches for azimuth and elevation and a single control for both.

To these and other ends, the invention consists in the construction, arrangement and combination of elements described hereinafter and pointed out in the claims forming a part of this specification.

A practical embodiment of the invention is illustrated in the accompanying drawings wherein:

Figure 1 is a sectional view of the gear housing taken through the gear axes.

Figure 2 is a section taken on the line 2—2 of Figure 1.

Figure 3 is a section taken on the line 3—3 of Figure 1.

Figure 4 is an axial section of a modification of the gearing with an alternative form of adapter.

Figure 5 is a perspective view of a control cam arrangement.

Figure 6 is a view in side elevation of one of the cams.

Figure 7 is an end view of the cam of Figure 6.

Figure 8 is an elevational view in section of one form of brake, and

Figure 9 is an axial section of a modification of a gearing unit.

Referring to the drawings by characters of reference there is shown in Figure 1 a gear housing 1. A drive shaft 2 leading from the power source (not shown) and journaled in the housing 1, as at 3, carries two pinions 4 and 5. Since the gearing in the housing is laid out in two identical parts symmetrical about the drive shaft, only one set need be described.

Outer pinion 4 engages an idling gear 6 mounted on a shaft 7 carried by the housing as at 8 and 9. Another idling gear 10, also on shaft 7 is rotated in a direction opposite to that of gear 6 by inner pinion 5 through the intermediary of an auxiliary gear 11.

The rotation of either gear 6 or gear 10 is transmitted selectively to the shaft 7 by means of a clutch comprising a ring gear 12 of conventional design, fitted on an inner spur gear 12a splined to the shaft 7. For engagement with the sliding clutch 12, gears 6 and 10 carry auxiliary clutch parts in the form of gears 13 and 14, respectively. Instead of the clutch 12 shown, an ordinary spur gear may be used as the sliding clutch, and parts 13 and 14 designed as internal ring gears.

Shaft 7 at its other end carries a bevelled pinion 15 and an idler bevel gear 16. Surrounding gears 15 and 16 is a ring gear 17 carrying, on pivot shafts 18 in saucer-like depressions 19 in its inner periphery, two bevel gears 20, each meshing with gears 15 and 16. Ring gear 17 is geared to the driven system (not shown). Since rotation of ring gear 17 is to some degree inhibited by the inertia of the driven system, the motion of pinion 15 will merely rotate gears 20 about their pivots 18 and rotate gear 16 which is normally free for such motion. However, when gear 16 is restrained from rotation, ring gear 17 will be carried in rotation by the gears 20 acting through the pivots 18, and the gear 16 may be so restrained by means of a brake band 21.

Both the brake and the reversing gears are operated from a single control pedal 22 pivoted as at 23. Pivoted at one end of pedal 22 is a bar 24 arranged to slide on a bearing block 25. On the side of the bar 24 opposite the bearing block 25 is a tooth 26 engaging in a slot 27, a follower 28 pivoted at 29, and the follower is linked to the shifting gear 12 by means of a rod 30 and a ring 31 surrounding the gear. Pivoted at the other end of the pedal is a rod 32 connected to the brake band 21, the latter of conventional design, as shown, for instance, in Figure 8. Either an up or down motion of rod 32 will, by means of its toggle arm 49, pivoted at 50, cause the riveted angle plates 51 on the ends of the brake band to approach each other and thus bring the band 21 into gripping engagement with the drum 33.

For the sake of clarity the pedal linkages with the gear housing have both been shown as in the plane of the drawings. However, it will be understood tht these will preferably be located adjacent each other, and in parallel planes for ready manipulation by a single operator.

In the neutral setting, the transmission unit will be set as shown in Figure 1. Sliding clutch 12 will lie between gears 13 and 14, and brake band 21 will be out of engagement with its drum 33 which is integral with the idling gear 16. With the sliding clutch 12 in this neutral position, input shaft 2 is free to turn and carry with it the gears 6 and 10, the latter revolving in opposite senses. A swing of the pedal 22 in either direction about its pivot 23 will urge the follower 28 into rotation about its pivot 29, thus carrying the rod 30 and ring 31 and sliding gear 12 into engagement with one of the gears 6, 10. Shaft 7 is thus brought into rotation and, with it, the gears 15, 20 and 16.

The brake operating leverage of pedal 22 is so arranged that the sliding clutch 12 may be brought into full engagement with gears 13 or 14 without bringing the brake band 21 into engagement with its drum 33 and hence without rotating the output ring gear 17. This permits a neutral position with gears in full mesh. Further pressure on pedal 22 will bring the brake band into engagement with the drum, and during this advanced action of the pedal, tooth 26 will escape the slot 27 in the follower 28, and leave it in position to be reengaged on the return journey. The gripping of the drum 33 stops rotation of gear 16 and gears 20 are forced to roll thereon, carrying with them the ring gear 17.

In Figure 4 is shown an output unit wherein the ring gear 17 is replaced by another form of adapter 34 operating on the same principle but carrying a shaft 35 instead of gear teeth. Shaft 7, in this case, is journalled into the adapter, as at 36, instead of into the housing.

In Figure 9 is shown still another form of output unit wherein the shaft 7 has a pinion 52 centered within an idling ring gear 53 and transmitting motion thereto by means of planet gears 54. Planet gears 54 carry a hub 55 fixed to the driven shaft 56 but the latter will not rotate as long as ring gear 53 is free to do so. When the brake band 21 is applied to the outer periphery of ring gear 53 the planet gears 54 will carry the hub 55 and shaft 56 in rotation.

Instead of the pedal control shown, a cam arrangement such as the cylinder 37 shown in Figure 6 may be used. The cylinder is formed with cam grooves 38 and 39. Groove 38 has an oblique portion 40 for advancing a follower longitudinally of the cylinder to shift the reversing gear, the normal position of the follower, representing neutral position of the gears, being midway of the oblique portion 40. Thus, rotation of the cam cylinder 37 will urge the follower in a direction longitudinally of the cylinder. This motion, which may be reversed by reverse rotation of the cylinder, is transmitted to the clutch, such as 12 in Figure 1. The other groove 39 has two oblique branches designed to advance a follower in the same direction longitudinally of the cam cylinder irrespective of the direction of rotation of the cylinder. This follower is connected with a brake and transmits a force thereto of similar direction for either direction of rotation of the drum from its neutral position. In this case the double action type of brake such as shown in Figure 8 will not be necessary. Two of these cylindrical cams will be used, for the elevation and azimuth controls, respectively.

In Figure 5 is shown an arrangement whereby a single control may be used to operate both cams. A hand lever 41 is anchored by means of a ball and socket joint 42 and the axial bores 43 of cam cylinders are rotatably mounted on fixed shafts 44. Torque arms 45 are slidably fitted in longitudinal bores 46 spaced eccentrically in the cylinder faces, and forked ends 47 of arms 45 are secured by pinning in slots 48 in the lever 41. The axis of the central bores 43 passes through the center of the socket joint 42.

Rotation of the cylinders is accompanied by motion of followers in the cam grooves 38, 39. Either or both of the cylinders may be rotated by a single motion of the control lever 41. With respect to either cylinder the only relative motion of the hand lever 41 is in a plane through the axis of the cylinder and the torque arm 45. Any other motion of the hand lever will carry the cylinder with it. Thus, in order to rotate one cylinder only, motion of the hand lever is in the above-mentioned plane through the other cylinder and vice versa. Motion of the lever in any direction other than these two planes will rotate both cylinders. They will be rotated at equal speeds when motion of the lever is in a plane bisecting the angle between the cylinders and at varying relative speeds for other directions of motion of the lever.

While several modifications of the invention have been shown it will be understood that they represent preferred forms and that the invention is not to be deemed as limited thereby. Other means of control than the foot pedal and hand lever shown may be used. For instance, electric or hydraulic brakes or clutches may be used, or any combination thereof may be employed.

I claim:

1. Power transmission mechanism comprising rotatable power input means, a plurality of rotatable power output means and a reversible driving connection between the power input means and each of said power output means, coupling means for each of said power output means, said coupling means comprising differential gearing having an idler gear, a brake for said idler gear, and a single control means for each reversible connection and its corresponding coupling means.

2. Power transmission mechanism comprising rotatable power input means, a plurality of rotatable power output means and a reversible driving connection between the power input means and each of said power output means, coupling means for each of said power output means, said coupling means comprising differential gearing having an idler gear, a brake for said idler gear, and a single control means for each reversible connection and its corresponding coupling means, said control means comprising a linkage with the brake and a releasable linkage with the reversible driving connection, whereby further application of the control means for applying the brake may be continued after release of the reversible driving connection.

3. Power transmission mechanism comprising rotatable power input means, a plurality of rotatable power output means and a reversible driving connection between the power input means and each of said power output means, coupling means for each of said power output means, said coupling means comprising differential gearing having an idler gear, a brake for said idler gear, and a single control means for each reversible connection and its corresponding coupling means, said control means comprising a medially pivoted member, a linkage between one arm of said member and the brake and a linkage between the other arm of said member and the reversible driving connection, said latter linkage comprising a toggle unit with curved periphery having a slot and a toothed bar engaging said slot during a portion only of the swing of the toggle unit.

4. Power transmission mechanism comprising rotatable power input means, a plurality of rotatable shafts and a reversible driving connection between the power input means and each of said shafts, coupling means for each of said shafts, a single control means for each reversible connection and its corresponding coupling means, said coupling means comprising a unit surrounding said shaft, a first bevel gear pivoted to the inside of said unit for rotation in a plane parallel to the axis of said unit, a second bevel gear fixed to and concentric with said shaft and engaging said first bevel gear, a third bevel gear idling on said shaft and engaging the first bevel gear, and means to impede rotation of said third bevel gear.

5. Power transmission mechanism comprising rotatable power input means, a plurality of rotatable shafts and a reversible driving connection between the power input means and each of said shafts, coupling means for each of said shafts, a single control means for each reversible connection and its corresponding coupling means, said coupling means comprising a spur gear fixed to said shaft and concentric therewith, a ring gear surrounding said spur gear, planetary gears meshing with said spur gear and said ring gear, power coupling means connected to said planetary gears, and means to impede rotation of said ring gear.

6. A device as in claim 4 in which said unit comprises a ring gear.

7. A device as in claim 4 in which said unit comprises a sleeve with an extension in alignment with said shaft.

8. A device as in claim 1, in which said single control means comprises a cam unit.

9. A device as in claim 1, in which said single control means comprises a cam unit, and a plurality of cam units are operated from a single manipulator.

10. A device as in claim 1 in which said single control means comprises a drum-shaped unit rotatable about its axis and having cam grooves in its peripheral surface.

11. Control means comprising a plurality of cylinders having cam surfaces having non-parallel axes in the same plane, a manipulating member universally mounted at the point of intersection of said axis when extended, and a rod slidably mounted in each cylinder parallel to its axis but eccentric thereto and pivoted to the said member, the pivot points for said rods on said member being on opposite sides of said universal mounting.

12. Power transmission mechanism comprising rotatable power input means, rotatable power output means, a reversible driving connection between the power input means and said power output means, coupling means for said output means, said coupling means comprising differential gearing having an idler gear, a brake for said idler gear, and a single control means for said reversible connection and said coupling means.

13. Control means comprising a medially pivoted member, a transmission linkage on each arm of said member and a slip connection in one of said linkages whereby the latter is effective during only a portion of the motion of the control means, said slip connection comprising an arm having a tooth and a pivoted member with curved surface having a slot engaging said tooth.

14. Power transmission mechanism comprising rotatable power input means, a rotatable power output means, a pair of rotatable transmission means between the said input and output means, means to rotate said transmission means in opposite senses, clutch means for selectively engaging said transmission means, coupling means at the output means and means constructed and arranged to conjointly actuate the clutch means and the coupling means.

GEORGE C. GENTRY.